Jan. 9, 1968  R. A. MILLIKEN  3,363,245
DIGITAL DISPLAY HAVING LATERALLY INTERJACENT
CHARACTERS PROJECTED BY MIRROR MEANS
Filed Feb. 10, 1965  7 Sheets-Sheet 1
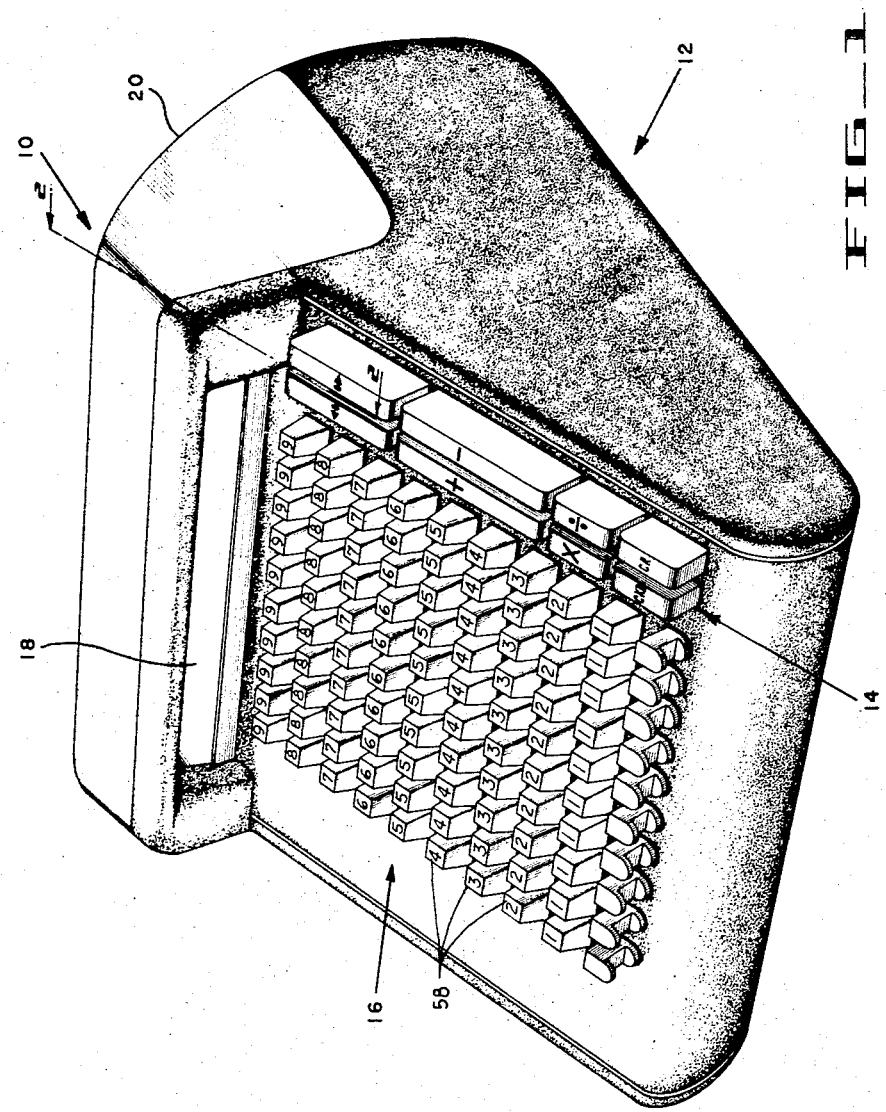
RANKIN A. MILLIKEN
INVENTOR
BY *Robyn Hilcox*
ATTORNEY

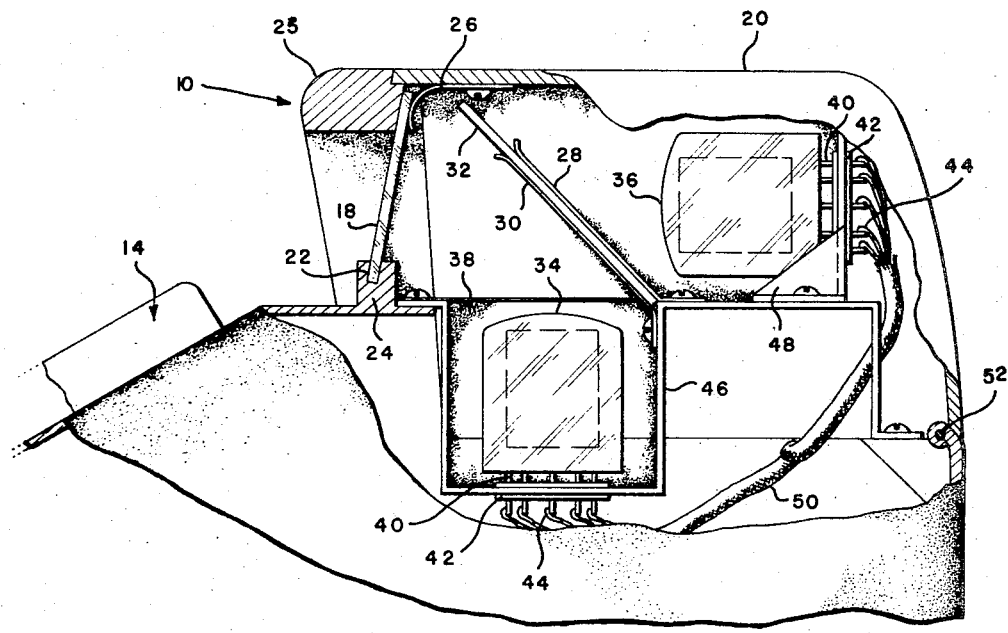
FIG_2
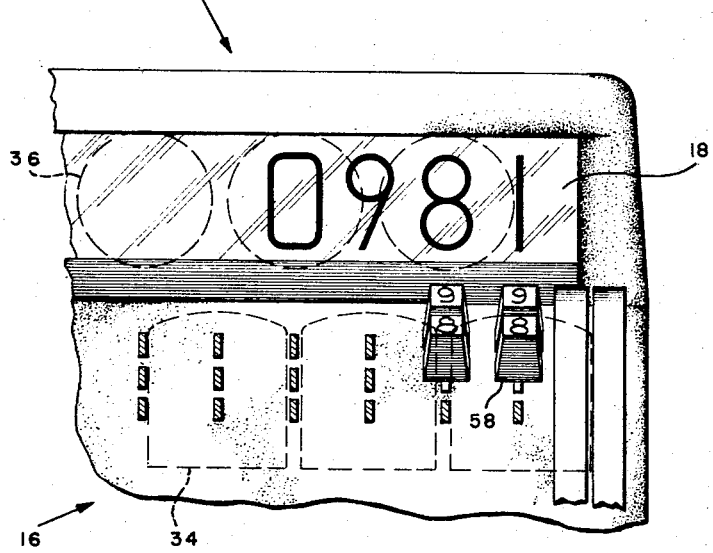
FIG_3

Jan. 9, 1968   R. A. MILLIKEN   3,363,245
DIGITAL DISPLAY HAVING LATERALLY INTERJACENT
CHARACTERS PROJECTED BY MIRROR MEANS
Filed Feb. 10, 1965   7 Sheets-Sheet 3
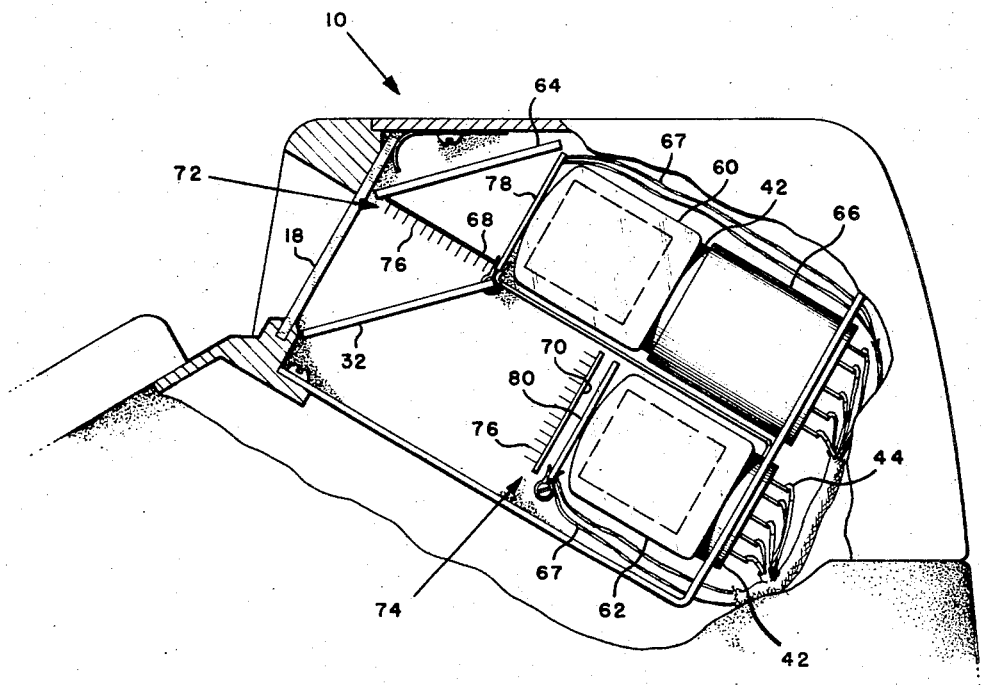
FIG_4
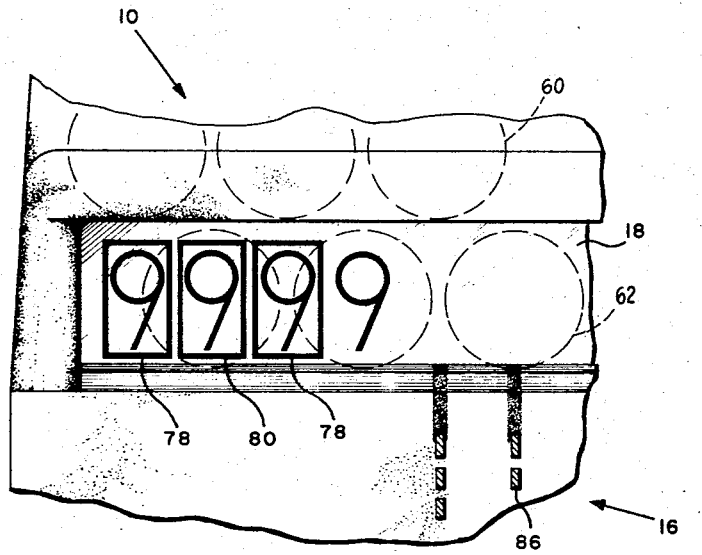
FIG_5

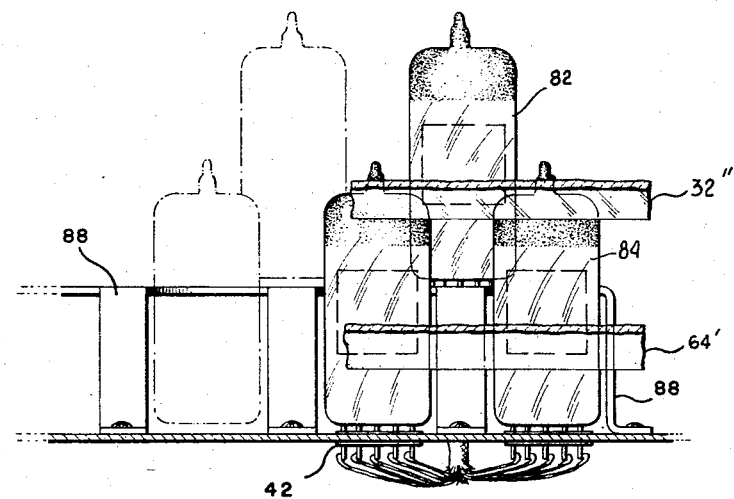
FIG_6
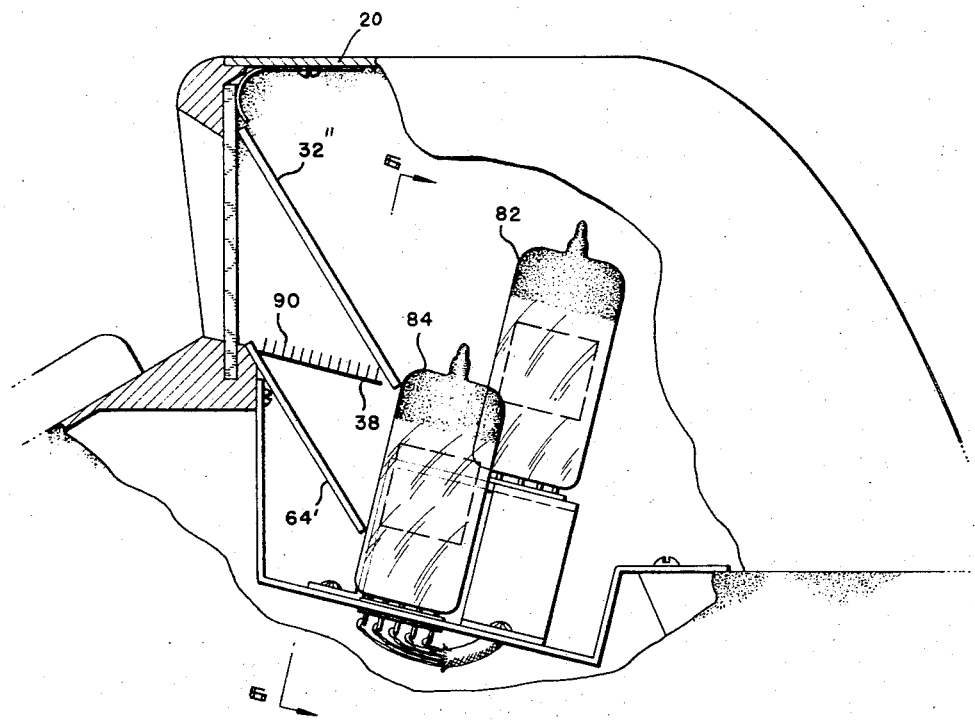
FIG_7

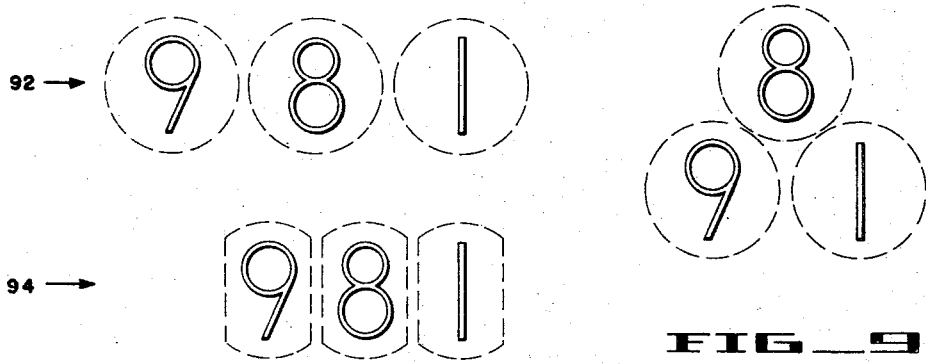
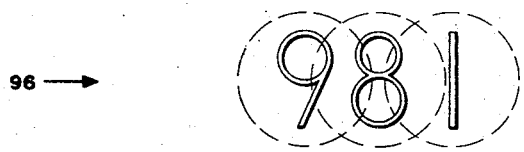
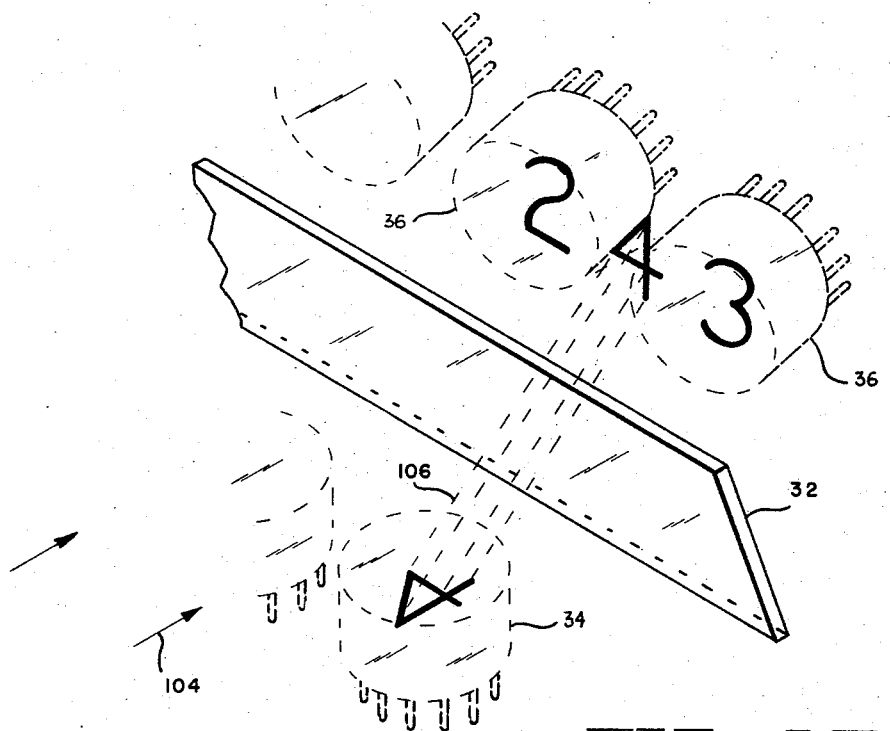

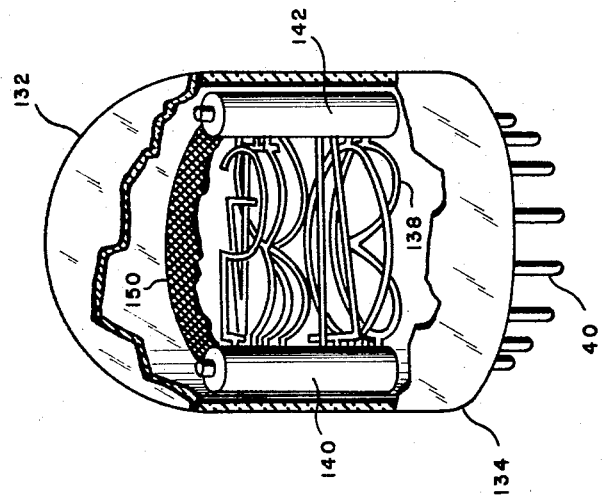
FIG_13
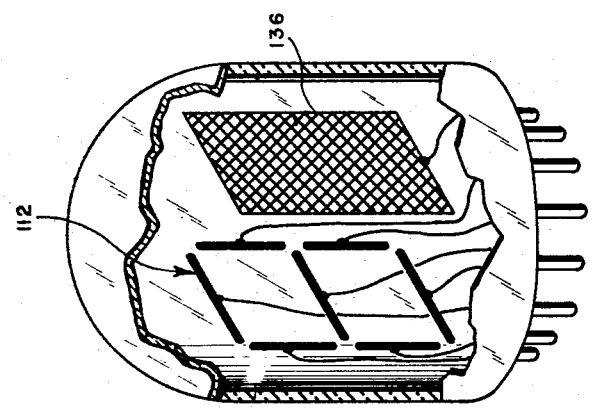
FIG_12
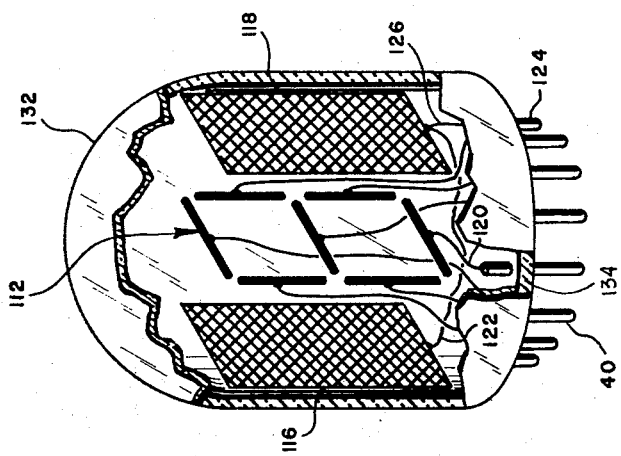
FIG_11

Jan. 9, 1968 R. A. MILLIKEN 3,363,245
DIGITAL DISPLAY HAVING LATERALLY INTERJACENT
CHARACTERS PROJECTED BY MIRROR MEANS
Filed Feb. 10, 1965 7 Sheets-Sheet 7
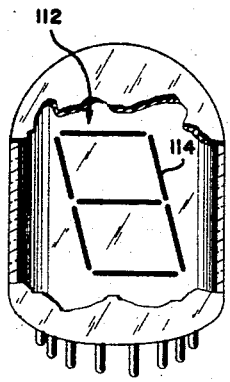
FIG_14a
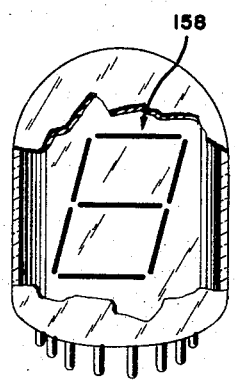
FIG_14b
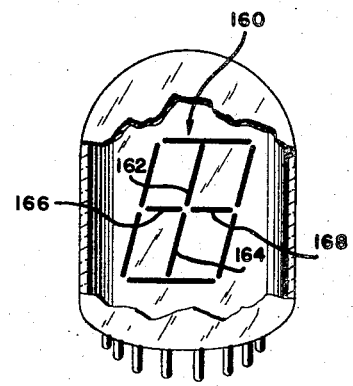
FIG_15
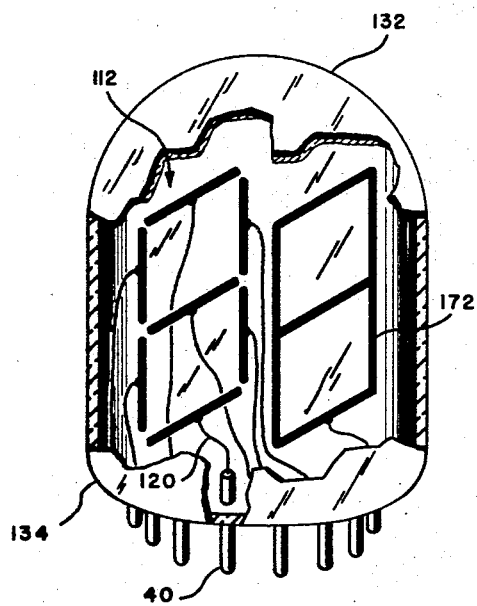
FIG_16
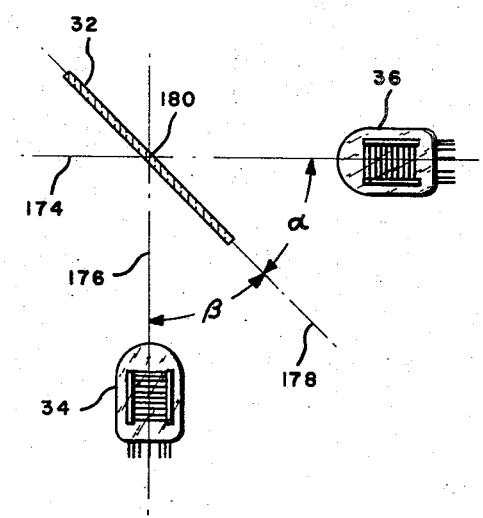
FIG_17

United States Patent Office 3,363,245
Patented Jan. 9, 1968

3,363,245
DIGITAL DISPLAY HAVING LATERALLY INTER-JACENT CHARACTERS PROJECTED BY MIRROR MEANS
Rankin A. Milliken, Castro Valley, Calif., assignor to Friden, Inc., a corporation of Delaware
Filed Feb. 10, 1965, Ser. No. 431,539
6 Claims. (Cl. 340—378)

This invention relates to electronic alpha-numeric indicators, and more particularly to compact digital displays adapted to use individual character indicators in an array having minimum viewing area.

Prior art digital display devices of the type comprising a linear horizontal array of individual character indicators have, by necessity, required an extended horizontal viewing area. The prime reason for the extended horizontal viewing area is the inefficient use of such viewing area. The term "compaction factor" is herein employed to indicate the degree of efficiency of a display device and is defined as the ratio between the sum of the widths of all the characters displayed and the total width of the display measured from the left edge of the leftmost character to the right edge of the rightmost character. Low compaction factors are typical of the display units of the prior art because of the physical size of the individual character units as they are arrayed side-by-side. A compaction factor of forty-four percent (44%) is common among digital display devices of the type employing alpha-numeric indicating tubes. In contrast, a compaction factor of eighty-seven percent (87%) is typical of lettering found in advertising and communication media. The display device of the instant invention achieves a typical compaction factor of eighty-six percent (86%). A particular disadvantage of inefficient digital displays is the requirement that an enlarged instrument or machine be provided to accommodate the display unit. Further, as is well known in the art, it is highly desirable to vertically align each order of the keys of the keyboard of a calculator, or the like, with the corresponding numerical orders of the display unit. The formats of certain machines now in use offer either a compact keyboard with the digital indicators and the digit keys of the keyboard out of vertical alignment, or a vertically aligned display area with an awkwardly spaced keyboard.

It is, therefore, an object of the present invention to provide a compact digital display device requiring a minimum of viewing area.

Another object of the invention is to provide a display having a higher compaction factor than hitherto possible.

Another object of the invention is to provide a display having a high compaction factor, preferably of the order generally found in conventional printed matter, and which utilizes glow indicating tubes of usual size and design.

One embodiment of the invention is to provide a display apparatus haivng a high compaction factor, and which renders the employment of mirror image glow indicating tubes unnecessary.

Other objects of the invention will, in part, be obvious and will, in part, appear hereinafter.

For a fuller understanding of the nature and objects of the invention, reference should be had to the following detailed description taken in connection with the accompanying drawings, in which:

FIG. 1 is a perspective view of an automatic calculator having a compact display unit constructed in accordance with the present invention;

FIG. 2 is a partial cross-sectional elevation showing a side view of a first embodiment of the compact display unit which uses end view indicating tubes, the view being taken on a plane indicated by line 2—2 of FIG. 1;

FIG. 3 is a partial front elevational view of a compact display unit which illustrates the vertical alignment of the individual characters of the display unit with the corresponding orders of keys of the keyboard;

FIG. 4 is a partial cross-sectional elevation showing a side view of a second embodiment of a compact display unit constructed in accordance with the instant invention, the view being taken along a plane substantially as indicated by the line 2—2 of FIG. 1;

FIG. 5 is a partial front elevational view of the second embodiment showing the compact display unit which illustrates a frame means for each character of the display;

FIG. 6 is a partial front cross-sectional elevational view of a third embodiment and shows the alternating positions of the first and second rows of side viewing indicating tubes, the view being taken along the plane indicated by the line 6—6 of FIG. 7;

FIG. 7 is a partial cross-sectional elevation which shows a side view of the third embodiment of the compact display unit which utilizes "side-looking" indicating tubes;

FIG. 8 is a comparison of the relative spacing of different types of gaseous glow indicating tubes in various types of displays;

FIG. 9 shows the arrangement of the glow indicating tubes of the second embodiment of the instant invention to provide a minimum overall height of the display area;

FIG. 10 is a diagrammatical view of the principal elements of the first embodiment of a compact display unit and shows the positioning of the indicating tubes relative to a semireflective element;

FIG. 11 is a diagrammatical view of a gaseous glow indicating tube constructed in accordance with another aspect of the instant invention;

FIG. 12 is a diagrammatical view of a second embodiment of a gaseous glow indicating tube;

FIG. 13 is a pictorial view of an end view gaseous glow indicating tube having mirror image cathodes;

FIG. 14a is a diagrammatical view of a mirror image multisegment cathode indicating tube;

FIG. 14b is a mirror image of the multisegment cathode indicating tube shown in FIG. 14a;

FIG. 15 is a diagrammatical view of a multisegment cathode indicating tube having three additional elements designed to provide a central "1" in a box "8" design;

FIG. 16 is a diagrammatical view of a multisegment cathode and a rectilinear figure "8" anode indicating tube; and FIG. 17 is a diagram of two indicating tubes and a semireflective element which shows the angles formed therebetween.

According to one aspect of the instant invention, a plurality of indicia manifesting devices, such as the character-indicating glow tubes of the instant invention, are grouped into subpluralities comprising two parallel rows. One row of characters is viewed directly through a semireflective and semitransparent element, such as a half-silvered mirror; the other row is viewed as reflections from the half-silvered mirror. The images of both rows will then be partially superposed upon each other by an overlapping of the images of the tube envelopes. However, the images actually seen are those of the individual characters with the character images of one row being alternately positioned among the character images of the other row. The characters selected for display will glow brightly with equal intensity and will stand out against the nonilluminated background of the tube envelopes. Thus, the characters will appear to lie in a single plane, thereby creating the effect of an integrated display.

The term "mirror image" as used in this description refers to an image or an object which appears with its right side where its left side would ordinarily be, and its left side where its right side would ordinarily be. The top and bottom portions of the image remain in their customary positions. The object (or image) may be considered as having been rotated 180° about a vertical axis through the center of the object. The term "normal image" refers to an object which appears as it is customarily viewed. The term "mirror image" as used herein is not limited to images seen in mirrors. That is, the term "mirror image" applies to any object, whether that object is seen in a mirror, or otherwise, which presents the appearance of having been reflected from a mirror.

A preferred embodiment of the display unit contemplated by this invention uses gaseous glow indicating tubes of unique design. The purpose of these tubes will be appreciated upon consideration of the two types of optical images described herein, namely, the normal, or directly viewed, image of an object, and the mirror, or reflected, image of an object.

The use of reflected images in this invention requires that such images be "rectified" in order to achieve a meaningful display. A character constructed in mirror image form is considered to have been rectified if, upon viewing the reflected image of such a character in a mirror, such reflected image then appears to be a normal image.

According to one embodiment of the instant invention, gaseous glow indicating tubes similar to the type manufactured by the Burroughs Corporaton under the trade name "Nixie" are employed in both the mirror image and normal image forms. Glow indicating tubes having cathodes in the form of normal image characters are alternately combined with indicating tubes having cathodes in the form of mirror image characters. Rectified images of the mirror image tubes are presented by reflection to appear as normal images. As a result, a partial overlapping of the image area (but not characters) is achieved with a saving in horizontal display area, i.e., a high compaction factor is achieved.

Referring to the drawings, in FIG. 1 there is shown a compact display unit 10 associated with an automatic calculator 12. A standard ten-column keyboard 16 is provided with conventional function keys 14 to perform various arithmetical operations. A viewing window 18 is conveniently positioned above the keyboard 16 so that each order of the displayed digits may be vertically aligned with the corresponding orders of keys of the keyboard 16. A removable cover 20 is provided for access to the indicating tubes and circuitry within. The particular application of the compact display unit described herein is representative of a number of applications, other than calculating devices, for which the display unit may be utilized. Such applications include measuring and testing devices which require the display of digital information.

The first embodiment of the instant invention uses end view gaseous glow indicating tubes, as shown in FIG. 2. A first plurality of end view glow indicating tubes 36 of the normal image type are positioned directly behind, and parallel to, a semireflective and semitransparent element 32. The axes of these glow tubes 36 lie along the line of sight of an operator viewing the window 18, and hence are seen by the operator through the element 32 in a normal manner. In this embodiment of the instant invention, the semireflective and semitransparent element 32 comprises a half-silvered mirror. Each of the normal image tubes 36 plugs into a suitable tube socket 42 which is secured by means of suitable fasteners, such as screws, to a mounting bracket 48. The mounting bracket 48 is fastened directly by screws to the main frame 46 of the display unit 10. A second plurality of end view glow indicating tubes 34 of the mirror image type are positioned beneath, and parallel to the semireflective and semitransparent element 32. This second group of glow tubes are in staggered relationship to the first group and their axes are perpendicular to the line of sight of the operator, and hence are seen by the operator by reflection by the element 32 and as lying between the glow elements of the first plurality. Each of the mirror image tubes 34 plugs into a suitable tube socket 42 mounted directly upon the main frame 46 of the display unit 10. Suitable electrical connections 44 from the tubes 34 and 36 to a digit selection circuit (not shown) are provided by means of a cable 50 connected to pins 40 projecting through each of the mounting tube sockets 42.

The viewing window 18 is located at the front section of the display unit 10 in a manner allowing easy removal thereof. The lower portion of the window 18 is removably positioned in a longitudinal slot 22 provided in a mounting shoulder 24 of the frame 46. The upper portion of the viewing window 18 is held in place by a plurality of spring clips 26. Each spring clip 26 is fastened by screws to the cover 20 of the display unit 10 and presses the upper portion of the viewing window 18 against a shoulder 25 of the frame 46. A plurality of opposed, elongated, retaining strips 28 and 30, suitably secured to the frame 46 by suitable fastening means, such as screws, are provided to hold the semireflective and semitransparent element 32 in proper position with respect to tubes 34 and 36. Upon removal of the cover 20, access may be had to the interior of the display unit 10 for changing the indicating tubes 34 and 36, or replacing the viewing window 18. It will be noted that, upon raising the cover 20, the upper portion of the viewing window 18 is released. The viewing window 18 may then be easily removed. The cover 20 is secured to the frame 46 by a hinge 52 so that the cover 20 may be swung clear of the major portion of the display unit 10.

A light filter 38 may be positioned above the mirror image indicating tubes 34 in the lower section of the display unit 10 and is fastened by means of suitable fasteners, such as screws, to the frame 46 directly behind the viewing window 18. The purpose of the light filter 38 is to provide a means for equalizing the intensity of the illuminated characters displayed by the normal image indicating tubes 36 and the mirror image indicating tubes 34. This adjustment is accomplished by selecting a light filter having an appropriate transparency. The equalizing process described above may also be accomplished by positioning the light filter 38 before the upper row of normal image indicating tubes 36.

In order to create an ideal display, the normal image indicating tubes 36 and the mirror image indicating tubes 34 should be located substantially equal distances from the semireflective and semitransparent element 32.

FIG. 13 shows the type of mirror image gaseous glow indicating tube employed in the embodiment of the instant invention shown in FIG. 2. It will be noted that all of the character-shaped cathodes used in this tube are constructed in a mirror image form.

Various types of semireflective and semitransparent elements may be employed in the instant invention to perform the required function. The particular type of element used to create the necessary optical effect should be a semireflective and semitransparent material having approximately fifty percent (50%) light transmission and fifty percent (50%) light reflectivity. However, the prefix "semi" as used in the terms semitransparent and semireflective is intended to convey a meaning considerably broader than fifty percent (50%). In fact, a variation from the above specification may be required, depending upon the positioning of the indicating tubes and the construction of the display unit. A specially prepared, coated, plastic film, such as that sold under the trade name "Mylar," might also be employed as the semireflective and semitransparent element.

The characters displayed by the two banks of indicating tubes 34 and 36 of FIG. 2 are shown in FIG. 3 as they would appear in a digital display provided by the instant invention. The mirror image indicating tubes 34 are represented by rectangularly-shaped dotted outlines. The configurations of these dotted outlines indicate that the mirror image tubes 34 are facing upwardly. The normal image indicating tubes 36 are represented by dotted circle outlines. The digits "0" and "8" enclosed by the dotted circles indicate that these digits are contained within the normal image indicating tubes 36. The digits "9" and "1" are not enclosed by dotted outlines to indicate that these digits are the reflected images of the mirror image indicating tubes 34, as represented by the rectangularly shaped dotted outlines, as mentioned above. The digit "9" will be seen to appear midway between the digits "0" and "8" and appears to be part of the display of the images of the normal image indicating tubes 36. The normal image indicating tubes 36 which, in this instance, are displaying the digits "0" and "8," are viewed directly through the viewing window 18 and the reflecting element 32 of FIG. 2 (not shown in FIG. 3). The digits "9" and "1" being displayed by the mirror image indicating tubes 34 are viewed by reflection from the semireflective and semitransparent element 32. The vertical alignment of each numerical order of the display with the corresponding orders of the keys 58 of the keyboard is also shown in FIG. 3. For example, the digit "1" of the units position of the display is positioned directly above the units column of keys 58 of the keyboard 16. In like manner, each of the numerical orders of the display are positioned directly above the corresponding orders of keys 58 of the keyboard 16.

A second embodiment of the present invention, as shown in FIG. 4, has the advantage of using one type rather than two different types of commercially available gaseous glow indicating tubes. A first plurality of end view glow indicating tubes 60 of the normal image type are positioned directly behind, and parallel to, a standard type of reflecting element 64, said element in this embodiment comprising a standard type of glass mirror. Each of the first plurality of tubes 60 plugs into the tube socket 42 mounted upon a socket extension member 66 to properly position the first plurality of tubes with respect to the associated optical components of the display unit 10.

A second plurality of end view glow indicating tubes 62, also of the normal image type, are positioned below the first plurality of tubes 60 and directly behind, and parallel to, a semireflective and semitransparent element 32'. Said semireflective and semitransparent element in this embodiment may comprise a half-silvered mirror as in the first embodiment.

A first light filter 68 and a second light filter 70 are provided to equalize the relative intensity of the images of the first plurality of indicating tubes 60 and the second plurality of indicating tubes 62. A first light baffle 72 is attached to the first light filter 68 in proximity to the first plurality of indicating tubes 60. A second light baffle 74 is attached to the second light filter 70 positioned directly before the second plurality of indicating tubes 62. The light baffles are used to reduce the spurious light reflections from the first and second pluralities of indicating tubes 60 and 62 and to create illuminated characters that are clearly defined.

Both the first and second light baffles 72 and 74 comprise a series of perpendicularly mounted metallic "fins" 76. The light rays emanating perpendicularly from the illuminated cathodes of the first and second pluralities of indicating tubes 60 and 62 will pass through the first and second light baffles 72 and 74. However, those light rays emanating from the illuminated cathodes of the first and second pluralities of indicating tubes 60 and 62 at an angle other than substantially perpendicular to such illuminated cathodes will be greatly diminished upon passing through the first and second light baffles 72 and 74.

A first illuminable frame 78 may be positioned in front of each upper indicating tube 60. A second illuminable frame 80 may be positioned in front of each lower indicating tube 62. Electrical connections 44, connecting each indicating tube of both the first and second pluralities of indicating tubes 60 and 62 with a digit selection circuit (not shown), are provided at the rear of the display unit 10. When illuminable frames 78 are used, electrical connections 67 are also provided to energize the illuminable frame-defining means 78 and 80.

The images of the first plurality of indicating tubes 60 are reflected from a "first surface" or "standard" type of mirror 64. The term "first surface" is intended to refer to a mirror, such as a glass mirror, which reflects all of the light striking the mirror. In the case of the first plurality of indicating tubes 60, the character image provided by each indicating tube is reflected from the first surface mirror 64, passed through a light baffle 72, and light filter 68 reflected from the semireflective and semitransparent element 32', and then is directed through the viewing window 18. The image of the character provided by each tube of the second plurality of indicating tubes 62 is viewed directly through the viewing window 18, the semireflective and semitransparent element 32, the light filter 70 and light baffle 74.

Both the first plurality of indicating tubes 60 in the upper row and the second plurality of indicating tubes 62 in the lower row are of the normal image type. This convenience is afforded by using a double reflection system comprising the semireflective and semitransparent element 32' and the first mirror 64. The image reflected by the first surface mirror 64 will appear as a mirror image. However, this mirror image is again reflected by the semireflective and semitransparent element 32' and is thereby rectified and presented as a normal image.

FIG. 5 illustrates a front view of the illuminable frame-defining means 78 and 80. It will be noted that the illuminable frame-defining means 78 and 80 are positioned behind, rather than on, the same plane of the viewing window 18, as might be interpreted from the appearance of FIG. 5. The position of the first and second pluralities of indicating tubes 60 and 62 of FIG. 4 are respectively shown by the dotted outlines in FIG. 5. Only three illuminable frame-defining means 78 and 80 are shown in FIG. 5. It will be understood that, in practice, all of the digit positions would have corresponding illuminable frame-defining means. The illuminable frame-defining means 78 and 80 may be individually selected, or selected in various combinations appropriate to distinguish one set of displayed characters from another set. Key stems 86 of the digit keys 58 are shown in cross-section to generally indicate the vertical alignment of the keys (not shown in FIG. 5) with the indicating tubes as represented by the dotted outlines 60 and 62.

"Side-looking" tubes or "side view" tubes may also be employed in the practice of the instant invention, as is shown in FIGS. 6 and 7 which illustrate a third embodiment of the invention. A mounting bracket 88, as shown in FIG. 6, is provided for mounting the upper row of indicating tubes 82 in the proper position relative to the optical system and the lower row of indicating tubes 84. Only portions of a first surface mirror 64', similar to mir- transparent element 32" similar to the semireflective and semireflective and semitransparent element 32' in FIG. 2, are shown in FIG. 6 to more clearly illustrate how said reflective elements appear in relation to the first and second pluralities of indicating tubes 82 and 84. A tube-mounting socket 42 is provided for each indicating tube of both the first and second pluralities of indicating tubes 82 and 84.

A side view of the third embodiment which employs side view tubes is shown in FIG. 7. The relative positions of the first surface mirror 64', the indicating tubes 82 and 84, and the semireflective and semitransparent element 32" are clearly seen in FIG. 7. A light filter 38 and a light baffle 90 may also be used in this embodiment.

The space-saving capabilities of the indicating tubes as employed in the instant invention may be appreciated by noting the comparison of the tube arrangements shown in FIG. 8. One type of commercially available, relatively inexpensive, indicating tube is generally indicated by the upper row of dotted outlines 92. The digits "9," "8," and "1" of the upper row of digits 92 are limited in the proximity of one digit to the other by the diameter of the indicating tubes. An arrangement which affords a closer spacing of the displayed digits is indicated in the second row of digits 94 by a more expensive type of indicating tube construction wherein the sides of the tubes have been flattened to allow for closer spacing of the characters. In this case, the digits "9," "8," and "1" of the second row of digits 94 are positioned closer to each other than the digits of the first row 92. The advantages of a relatively inexpensive tube as used in the upper row 92 and the space-saving qualities of the flat-sided indicating tubes of the center row 94 are not only achieved, but are bettered by the use of mirror image tubes in a display arrangement as previously described and as indicated in the lower row 96. In this arrangement, the relative positioning of the indicated tubes overlap considerably, allowing the digits "9," "8," and "1" to be placed closer together than has been hitherto possible, even in the more expensive space-saving arrangement of line 94.

A display unit of minimum height is provided by employment of the nesting capabilities of the indicating tube arrangement as shown in FIG. 9. In this arrangement, the digits "9," "8," and "1" may be arranged in two horizontal rows wherein the upper portions of the lower digits, such as the digits "9" and "1," are located within a convenient proximity to the lower portions of the upper row of digits, such as represented by the digit "8." Of course, the digits "9," "8," and "1" are seen by a viewer as the lower row of digits 96 in FIG. 8.

The relative positions of the indicating tubes and the semireflective and semitransparent element of the first embodiment may be seen more clearly in FIG. 10. Certain details of the compact display structure have been omitted from FIG. 10 in order to present a simplified diagram illustrating the basic concept involved. Only the two rightmost normal image indicating tubes 36 of a plurality of paraxially disposed tubes and the single rightmost mirror image tube 34 of a similar plurality of paraxially disposed tubes have been shown in addition to a right-hand portion of the semireflective and semitransparent element 32. Assuming that the number "243" has been selected for display, the digits would then appear as shown. That is, the digit "2" would be illuminated in the hundreds position, the virtual or rectified image of the digit "4" would appear to be illuminated in the tens position, and the digit "3" would be illuminated in the units position. An observer looking through the semireflective and semitransparent element 32 along a line of sight indicated by the arrows 104 would see the digits "2," "4" and "3" appearing in the same plane and of equal intensity. Although the image of the actual digit "4" is reflected from the semireflective and semitransparent element 32 toward the observer, i.e., in a direction opposite that shown by the arrows 104, the virtual image of the actual digit "4" will actually be seen to appear in the position shown by the upper rectified image of the digit "4." It should be noted that the construction lines 106 do not indicate lines of true optical projection, but serve only to illustrate the correspondence of points on the actual digit "4" with points on the virtual image "4" appearing between the digits "2" and "3." As previously explained, the image formed by a plane mirror is erect, reversed (the right side appears as the left side and vice versa), and the same size as the object. The reflected image appears to be exactly the same distance behind the mirror as the object is in front of the mirror. It is known as a mirror image, or virtual image, because it is not formed directly by light rays from the object, but rather by the extension of these rays behind the mirror. A typical illustration of this principle may be found at page 788 in volume III of the Harper Encyclopedia of Science, published by Harper and Row in 1963.

Another aspect of the present invention is the provision of an alternate form of gaseous glow indicating tube which may be employed in addition to the character-shaped cathode indicating tube previously described. Such a tube is illustrated in FIG. 11. An array comprising seven cathode segments 112 is arranged to form a rectilinear figure, or box "8," configuration ( |=| ). Each of the cathode segments 112 is in the form of a metal rod or short "stick." The term "stixie" will be used hereinafter to refer to an indicating tube having a cathode constructed of short sticks as described above. First and second rectangularly shaped screen anodes 116 and 118 are positioned on either side of the cathode array 112 to provide a difference of potential between said anodes 116 and 118 and the cathode array 112 and thereby permit ionization of the gas in the vicinity of preselected cathode segments 112. A condition of "cathode glow" within a given gaseous glow indicating tube is herein considered to have been established if said tube contains an illuminable gas at a pressure sufficient to support ionization thereof. An electrical potential is established within said tube between a cathode and an anode of a magnitude sufficient to support ionization of said gas. Each of the cathode segments 112 is connected to a separate tube pin 40 by means of a lead 120. The first and second anodes 116 and 118 are connected to a common lead 122 and are also connected to a tube pin 124 by means of a lead 126. The group of cathode segments 112 are arranged in a planar arrangement with the first and second anodes 116 and 118 located on either side of, and parallel to, the cathode array 112.

The electrical components previously described are surrounded by an ionizable gas which will cause certain preselected cathode segments 112 to glow upon energization of said cathode segments. The ionizable gas is contained within a transparent envelope 132 having a thickened base 134 adapted to constrain a plurality of pins 40 arranged in a manner adapted for insertion in common tube sockets. The common nine-pin base may be used for this type of indicating tube construction—in which case one pin is not used by the construction, as it needs seven for the seven elements of the "stixie" and one for the two anodes. The above-mentioned tube structure may be advantageously utilized in the form of the commonly used nine-pin miniature glass vacuum tube. The first and second anodes 116 and 118 are metallic wafers comprising a fine mesh screen to allow the viewing of the cathode array 112 through either the first or the second anodes 116 and 118 with a minimum of impairment. Individual characters are formed by preselection of the cathode segments 112 by suitable switching means (not shown) external to the tube envelope 132, thereby causing the selected cathode segments 112 to glow in the form of the desired character. The first and second anodes 116 and 118 are employed in this construction to insure a satisfactory ionization of the gas on both sides of the selected cathode segments 112. The construction of the above-mentioned tube permits the glow discharge surrounding selected cathode segments 112 to be viewed from opposite directions.

As will be apparent to those having ordinary skill in the art, certain alternative modifications of the structure shown in FIG. 11 may be employed. For instance, as shown in FIG. 12, it is possible, in certain embodiments, to employ a single anode 136 positioned parallel to the plane of the cathode array comprised of a group of seven cathode segments 112. However, such a structure will be more critical in the provision of a complete glow over the side of the cathode segments 112 remote from the viewer, as shown in FIG. 12, than will be the case of the double anode structure 116 and 118 of FIG. 11. Additionally, the single anode construction may involve the maintenance of more critical operating potentials to insure that the associated cathode segments 112 are fully glowing and to preclude the excitation of undesired glow.

There is shown in FIG. 13 a modified version of a standard type of gaseous glow indicating tube sometimes referred to as a "Nixie" tube. Such a tube is described in United States Patent No. 2,990,061 issued to J. H. McCauley on June 27, 1961. Unlike other indicating tubes having character-shaped cathodes, the character-shaped cathodes 138 of the indicating tube of FIG. 13 are shaped in mirror image form. The transparent envelope 132 contains an illuminable gas under a pressure sufficient to maintain ionization thereof. Within the envelope 132, a total of ten cathode indicator elements 138 are grouped in close proximity to one another, forming the series of integers consecutively progressing from "0" to "9." The cathodes 138 may be made of any suitable metal, for example, aluminum, Nichrome, molybdenum, or the like, and may be made in any suitable fashion as, for example, by etching, stamping, or the like. The cathode elements 138 are mounted and supported on the extension posts 140 and 142. The cathode elements 138 are arranged to overlap one another in spaced, stacked, parallel relationship on the posts 140 and 142. The planar surfaces are oriented transverse to the vertical axis of the tube and face the viewing end of the envelope 132. The cathode elements are so shaped and stacked in such order that each one is completely and clearly visible when glowing and is not "shadowed" by any of the other cathodes. Each cathode indicator element 138 is connected by a fine wire connecting lead (not shown) to a corresponding pin 40 at the base 134 of the tube envelope 132.

An anode 150 is provided within the tube envelope 132, and is preferably mounted between the stack of cathode elements 138 and an observer. In the tube shown in FIG. 13, the anode 150 comprises a comparatively fine mesh screen. The anode 150 is insulated from the cathodes 138 by washers or spacers (not shown) just as the cathodes 138 are insulated from each other. The anode 150 establishes the necessary difference of potential between itself and the various cathodes 138 in order to ionize the gas immediately surrounding a selected cathode and thereby illuminates a desired digit.

An alternate form of the cathode segment arrangements of FIGS. 11 and 12 is shown in FIG. 14a. The anodes and wire leads have been omitted from FIGS. 14a, 14b, and 15 for purposes of clarity. The cathode segments 112 are grouped in an array to provide characters with a leftward inclination. The image of the arrangement of the cathode segments 112 of FIG. 14a, upon reflection from a mirror, will appear as the array 158 in FIG. 14b, with the desired rightward inclination.

Additional cathode segments may be incorporated into the array 158 of FIG. 14b to produce the array 160 shown in FIG. 15. The two vertical central cathode segments 162 and 164 of the cathode array 160 of FIG. 15 allow the display of additional characters or symbols as selected by suitable switching circuits (not shown). The vertical central cathode segments 162 and 164 may be energized separately or simultaneously, depending upon the type of character desired. A simplification of the cathode array 160 of FIG. 15 may be realized by joining the two central horizontal cathode segments 166 and 168 together to form a single horizontal segment (not shown).

An indicating tube having both a cathode array and an anode constructed in the same general form as the cathodes described in FIGS. 11 and 12 is shown in FIG. 16. The cathode array 112 is comprised of a number of cathode segments and is formed in a rectilinear figure "8" configuration, as previously described. The interconnecting lead 120 connects each cathode segment 112 to the pin 40 affixed to the base 134 of the tube envelope 132. The anode 172 is constructed in a configuration similar to that of the cathode array 112. It is not necessary that the anode 172 be comprised of individual segments as in the cathode array 112 because the anode 172 serves merely to create the required difference of potential between the anode 172 and the cathode array 112. The actual character-defining segment combinations are selected by the cathode segments 112 of the cathode array. As previously described, an illuminable gas maintained at the pressure sufficient to sustain ionization thereof is contained within the suitable transparent envelope 132. The anode 172 is positioned in close proximity to the cathode array 112 and is parallel thereto. An observer viewing the anode 172 and cathode array 112 from a point perpendicular to the planes of said electrodes would see those cathode segments that had been previously energized as a glow appearing to surround corresponding portions of the anode 172. In this manner, the peripheral cathode glow may be observed without the obscuring effects of the anode 172.

One important requirement of the relative positioning of the indicating tubes and the semireflective and semitransparent element of the first embodiment is shown in FIG. 17. The normal image end view indicating tube 36 is located upon a horizontal reference line 174 through a mid-point 180 of the semireflective and semitransparent element 32. The mirror image end view indicating tube 34 is located upon a vertical reference line 176 which passes through the same mid-point 180 of the semireflective and semitransparent element 32. A first angle, $\alpha$, is formed by the horizontal reference line 174 and the plane 178 of the semireflective and semitransparent element 32. A second angle, $\beta$, is formed by the vertical reference line 176 and the plane 178 of the semireflective and semitransparent element 32. In order to achieve the proper character alignment as would be seen by observing illuminated characters through the viewing window of a display device, it is desirable that angle $\alpha$ be substantially equal angle $\beta$. It is not necessary that angle $\alpha$ and angle $\beta$ each be equal to forty-five degrees (45°). A certain variation above and below a forty-five degree (45°) angle may be desirable in other embodiments. By reducing the included angle from forty-five degrees (45°), the overall height of the display unit may thereby be decreased. However, it is necessary, when arranging a set of glow indicating tubes as in the instant invention, that the glow electrodes be substantially of the same height in both rows of tubes.

What is claimed is:
1. A device for displaying a plurality of indicia comprising:
 (a) a first plurality of paraxially disposed indicia-manifesting devices having normal indicia-manifesting means;
 (b) a second plurality of paraxially disposed indicia-manifesting devices having mirror image indicia-manifesting means, the several devices of which are laterally interjacent the several devices of the first plurality;
 (c) a planar, semitransparent reflective means; and
 (d) a supporting means for retaining said first and second pluralities of indicia-manifesting devices and said semitransparent reflective means in juxtaposition with one another such that said first plurality of indicia-manifesting devices is viewed directly through said reflective means and said second plurality of indicia-manifesting devices is viewed by reflection from said reflective means, the images of said indicia-manifesting devices thereby appearing to be coplanar.

2. A device for displaying a plurality of indicia comprising:
 (a) a first plurality of paraxially disposed indicia-manifesting devices having normal indicia-manifesting means;
 (b) a second plurality of paraxially disposed indicia-manifesting devices having normal indicia-manifesting means, the several devices of which are laterally interjacent the several devices of the first plurality;
 (c) a first planar, partially reflective and semitransparent element;
 (d) a second planar, totally reflective and nontransparent element; and
 (e) supporting means for retaining said first and second pluralities of indicia-manifesting devices and said first and second elements in juxtaposition with one another such that said first plurality of indicia-manifesting elements is viewed directly through said first element and said second plurality of indicia-manifesting devices is viewed by reflection from said first and second elements, the images of said indicia-manifesting devices thereby appearing to be coplanar.

3. A device for compactly displaying a plurality of glow indicator tubes comprising:
   (a) a first row of glow indicator tubes having normal indicia-manifesting means;
   (b) a second row of glow indicator tubes having mirror image indicia-manifesting means the several tubes of which are positioned to be laterally interjacent the respective tubes of the first row; and
   (c) semitransparent mirror means so positioned as to be in the line of sight to said first row of tubes and to reflect the images of the second row of tubes in alignment with the first row of tubes, whereby the second row of tubes appear to be coplanar with and interjacent the images manifested by said first row of tubes and rectified so as to appear normal.

4. A display device for displaying a plurality of glow indicator tubes in a single row of shorter length than the total of the widths of the several tubes comprising:
   a casing;
   a window in the front of said casing;
   a semitransparent mirror means behind said window;
   a row of glow indicator tubes behind said semitransparent mirror means and so arranged as to be visible through the window and the semitransparent mirror; and
   a second row of indicator glow tubes, the several tubes of which are laterally interjacent the several tubes of the first row, and are so arranged with respect to said semitransparent mirror means as to be visible through the window by reflection on the semitransparent mirror means in alignment with the tubes of the first row.

5. The device of claim 4 wherein the first row of glow indicator tubes have normal indicia and the second row of glow indicator tubes have mirror image indicia.

6. The device of claim 4 wherein both rows of glow indicator tubes have normal indicia, and comprising also a mirror means for reflecting the images from the second row upon the semitransparent mirror means.

References Cited

UNITED STATES PATENTS 2,402,660  6/1946  O'Grady _____ 88—24

FOREIGN PATENTS 423,214  1/1935  Great Britain.

JOHN W. CALDWELL, *Primary Examiner.*

NEIL C. READ, *Examiner.*

I. J. LEVIN, H. I. PITTS, *Assistant Examiners.*